Sept. 17, 1929.   R. N. TRANE   1,728,377
ELECTRIC HEATER
Filed May 4, 1928     2 Sheets-Sheet 1

Inventor
Reuben N. Trane.
By Williams, Bradbury, McCaleb & Hinkle
Attys.

Sept. 17, 1929.  R. N. TRANE  1,728,377
ELECTRIC HEATER
Filed May 4, 1928  2 Sheets-Sheet 2
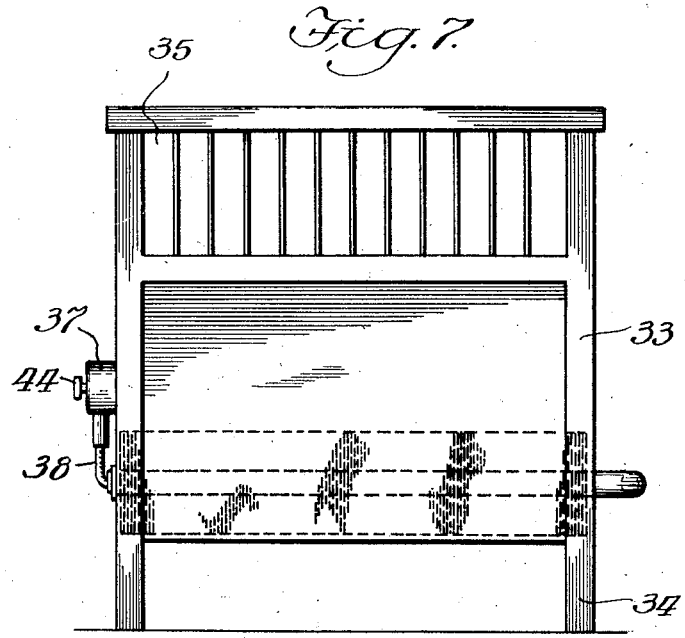
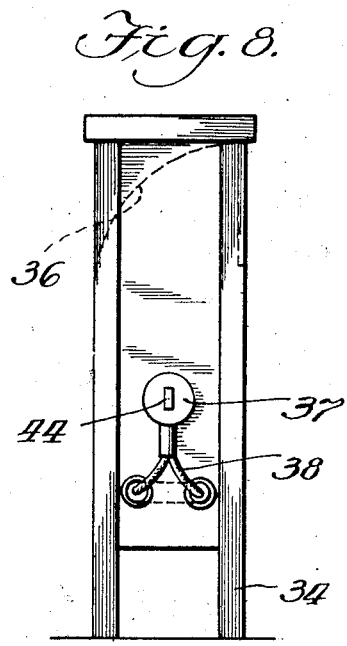
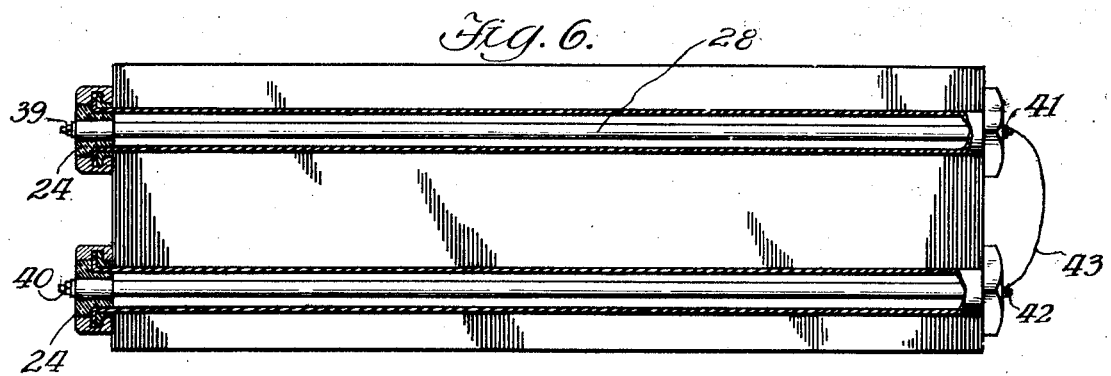
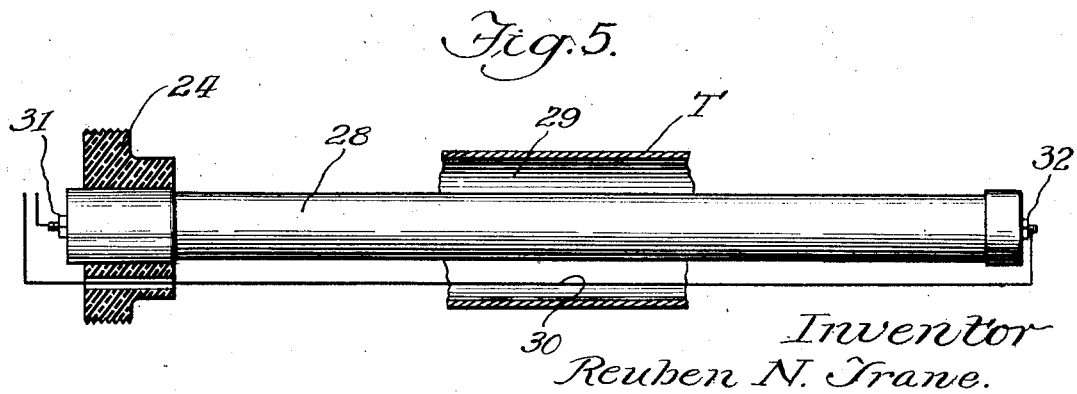
Inventor
Reuben N. Trane.
By Williams, Bradbury, McCaleb & Hinkle
Atty's Patented Sept. 17, 1929

1,728,377

UNITED STATES PATENT OFFICE

REUBEN N. TRANE, OF LA CROSSE, WISCONSIN

ELECTRIC HEATER

Application filed May 4, 1928. Serial No. 275,047.

This invention relates to an electric heater of the type in which a current of air is circulated through heat radiating fins as described in my copending application, Serial No. 104,196, filed April 23, 1926, of which this application is a continuation in part.

The object of this invention is to provide a heater of the type defined in said copending application in which an electric heating element can be readily substituted for the steam fittings shown therein.

A further object is to provide an electric heater having heat radiating fins with means for causing a current of air to flow through and contact with said fins.

A further object is to provide an electrical heating element which may be readily inserted in the tube of an ordinary steam heated radiator in modification or alteration thereof, which may be easily removed and interchanged, and which is characterized by an extremely simple and inexpensive structure.

Other objects will be apparent as the detailed description of my invention proceeds.

In the accompanying drawings, which illustrate a preferred embodiment of my invention and in which similar parts are designated by like reference characters throughout, Fig. 1 is a perspective of my improved radiator as described in my copending application;

Fig. 5 is a preferred modification of an electric heating element adapted to be used in a radiator as shown in Fig 3;

Fig. 6 is a modified radiator in which the heat tube is not bent and is open at both ends;

Fig. 7 is a side view of a cabinet in which the radiator of Fig. 6 is mounted; and Fig. 8 is an end view of said cabinet showing the connections to the thermostat switch.

Figure 3:
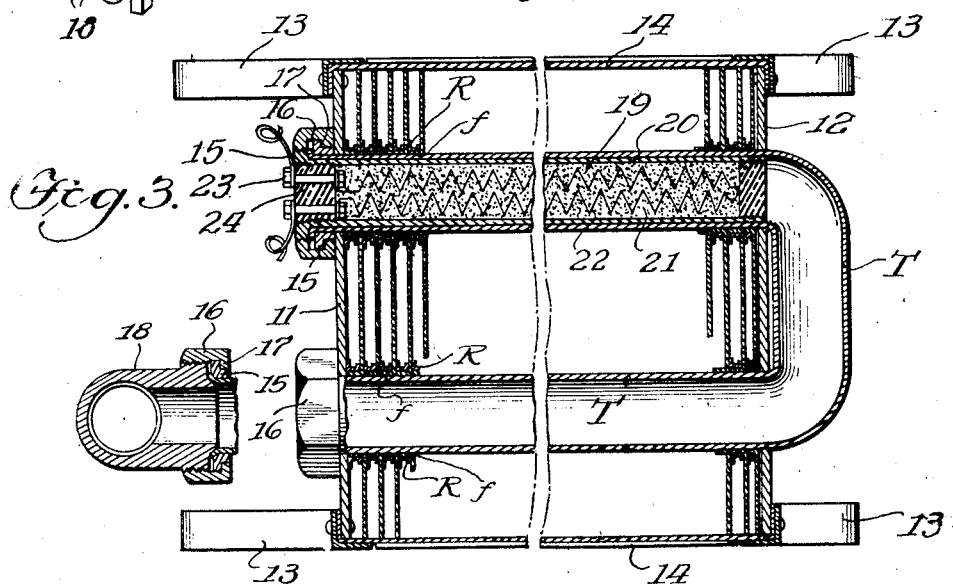
Fig. 3 is a horizontal section through such a radiator showing an electrical heating element in place of the conventional steam fitting.

The radiator herein described is of the type covered by my copending application and will, therefore, not be described in detail. It consists of a plurality of fins F secured to a heat tube T, said fins having flanged apertures therein for receiving said tube, the flanges $f$ of which are securely held against the tube and in good thermal contact therewith by means of reinforcing rings R which are preferably channel-shaped, as shown in Fig. 3, to increase the heat conducting area between the tube and the fins.

The unit may be assembled by inserting the fins on a tube which is bent in a U-shape (Fig. 3) with the rings acting as spacers between said fins and by subsequently expanding the tube to pinch the flanges against the reinforcing rings and secure the maximum heat conductivity therebetween.

The unit is preferably provided with end plates 11 and 12 which are rigidly secured to channel-shaped legs 13, said legs being offset as shown in the drawings in order to properly fit within and be hidden by the legs of the cabinet (Figs. 6 and 7) which is superposed over the unit.

The side of the radiator 14 may consist of flat plates secured to the end plates 11 and 12 or they may be formed by bending the ends of the fins as described in my copending application. In any event, it is important that the unit be provided with sides in order that the air may be restricted to a path between said fins for proper "chimney" action and heat exchange.

The ends of the tube T are bent over against a flanged collar 15; a nut 16 is provided with an inwardly extending shoulder adapted to coact with the flange 15 on the collar to form a union, as may be apparent from Fig. 3. In the prior applications this union is used to secure a pipe fitting 18 to the heat tube. My invention contemplates the provision of an electric heating element which is of a size and shape adapted to fit within the heat tube and which is mounted upon a base designed to be held in place by the nut 16.

In Fig. 3 such a heating element is generally indicated at 19 and it consists of a tube 20 carrying suitable insulating powder 21 in which is imbedded resistance heat elements 22. These elements are secured to suitable terminals 23 which are firmly secured to a head 24, said head being threaded to coact with the internal threads on the nut 16.

Figure 4:
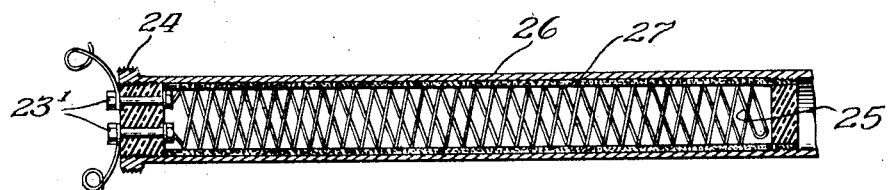
Fig. 4 is another modification of an electric heating element.

In Fig. 4 I have shown a modified heating element consisting of a high resistance coil 25 carried in a thin metal tube 26 with a layer of electrical insulating material 27 therebetween to prevent short-circuiting. This coil is likewise connected to suitable terminals 23′ which are secured in a head or support member 24′.

In Fig. 5 I have shown what is probably the simplest and most satisfactory heating unit of this type. It consists of a carborundum rod 28 whose diameter is about ½ inch less than the diameter of the tube T whereby a ¼ inch air space 29 is left between the rod and the tube, which air space serves as insulation. When this unit is used with a radiator, as shown in Fig. 3, a return wire 30 must be provided and insulated with asbestos or other suitable material.

The carborundum rod 28 is provided with suitable terminals 31 and 32 and one or both ends of the rod may be carried by suitable insulating heads 24 adapted to be held in place by nut 16 (see Figs. 5 and 6). In Fig. 5 the rod is securely and fixedly held in the insulating head while in Fig. 6 at least one end of the rod is slidably mounted therein so that the rod may be easily removed from or inserted in the tube.

The modification shown in Fig. 6 shows two heating elements 28 connected in series by conductor 43 but it is evident that a single tube could be used and that various parallel or series connections may be used without departing from the spirit of my invention.

Figure 1:
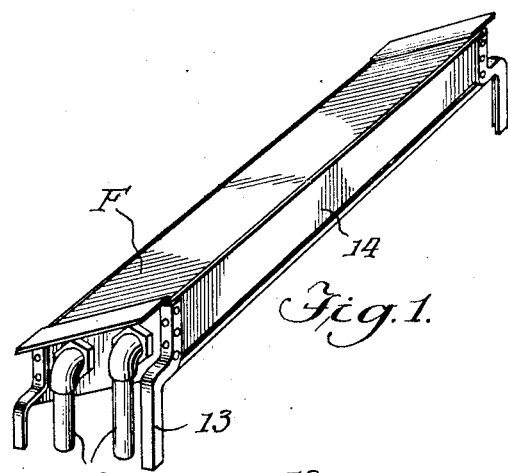
Figure 2:
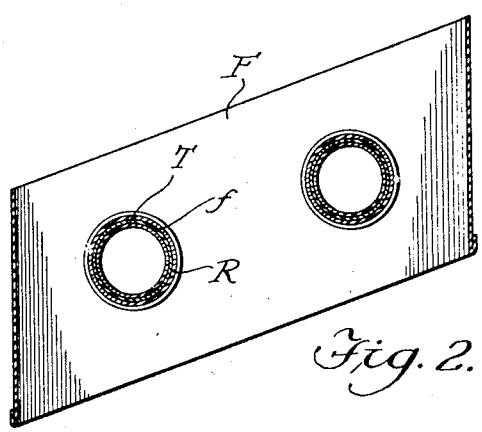
Fig. 2 is a section through said radiator showing a single heat radiating fin and the method of securing said fin in thermal contact with said pipe.

The radiator provided with electric heating units as above described, is preferably used in combination with a cabinet 33 which accentuates the "chimney" effect and increases the conduction of air through the unit. This cabinet may be of stamped metal or wood and may be ornamented to match the furniture in the room wherein it is used. The legs 34 of the cabinet are preferably angularly shaped and spaced to fit snugly over the legs 13 of the heater unit, as shown in Fig. 1, it being essential, of course, that access be provided for the intake of air into said heater. The top front of this cabinet is provided with a suitable grid 35 for discharging the air and a curved baffle plate 36 may be provided in the cabinet to deflect the air and direct it through said grid.

Particular attention is directed to the fact that no damper is used in the cabinet herein described. If such a damper is present, it should be removed or held inoperative for unless a cooling air current is always permitted to flow through the fins the heating elements may burn out.

In order to regulate the heat, I prefer to employ a thermostat switch control 37, which is connected by conductors 38 to the terminals 39 and 40 of the heater units, the other terminals 41 and 42 of these units being connected by a suitable conductor 43. The switch may be designed to vary the heating current in accordance with the temperature in the room. I also provide a manually-operated switch 44. It is understood that the thermostat control may be set at any desired temperature whereby additional current will be supplied when the room is colder than desired whereby the current will be reduced or cut off when a certain limit is reached. Thermostats of this type are well known in the art and a detailed description is not deemed necessary.

While I have described preferred embodiments of my invention, it is understood that I am not limited to the details set forth therein except as defined by the following claims.

I claim:

1. In combination, a tube, heat radiating fins in heat exchange relation thereto, means on each end of the tube whereby it may be selectively connected to a steam line or to an electric heating element, an elongated heating element, and a base for said heating element adapted to be secured by said means whereby said element is securely held in said tube.

2. In a heater, a tube, heat radiating fins, means for securing said fins to said tube in heat exchange relation, and means for selectively connecting the interior of said tube to a fluid or to an electric source of heat.

3. In a heater of the type using convection instead of radiation, a plurality of vertically disposed heat radiating fins, means to restrict the air flowing through the radiator to paths between the fins, a heat tube associated with said fins and means to selectively connect said tube with a source of heating fluid or with an electrical heating element.

4. In an electric heater, a plurality of heat radiating fins, a tube in heat conducting contact with said fins, a carborundum rod mounted within said tube, means including an air space for electrically insulating said rod from said tube, and means for causing a circulation of air through said fins.

5. An electric heater comprising a plurality of heat radiating fins, a heat tube in heat exchange relation thereto, a heating element within said tube, means for electrically insulating said element from said tube, and means restricting the air flowing through the radiator to paths between said fins.

6. An electric heater comprising a plurality of heat radiating fins, a heat tube in heat exchange relation thereto, a heating element within said tube, means for electrically insulating said element from said tube, means for causing air to circulate through the radiator, and means for restricting the air flowing through the radiator to paths between said fins.

7. An electric heater comprising a plurality of heat radiating fins, a heat tube in heat exchange relation thereto, a heating element within said tube, means including an air space for electrically insulating said rod from said tube, means for causing air to circulate through the radiator, and means for restricting the air flowing through the radiator to paths between said fins.

8. In an electric heater, a plurality of heat radiating fins, a tube in heat conducting contact with said fins, a carborundum rod mounted within said tube, means including an air space for electrically insulating said rod from said tube, and means for causing circulation of air through said fins, including air restricting means engaging the edges of said fins.

9. In a heater, a heating tube, heat radiating fins, means for securing said fins to said tube in heat exchange relation, means for selectively connecting the interior of said tube to a fluid or to an electrical source of heat, and means restricting the flow of air through the heater to paths between said fins.

10. A radiator comprising a plurality of heat radiating fins, a heat tube in heat exchange relation thereto, a heating element in said tube, means for selectively forming a connection between the interior of said tube and sources of different forms of energy, and means restricting the flow of air through the radiator to paths between the fins.

11. In an electric heater, a plurality of heat radiating fins, a tube in heat conducting contact with said fins, a carborundum rod mounted within said tube, means including an air space for electrically insulating said rod from said tube, means for causing a circulation of air through said fins comprising air restricting means engaging the edges of said fins.

12. In combination, a tube, heat radiating fins in heat exchange relation thereto, means on each end of the tube whereby it may be selectively connected to a steam line or to an electric heating element, an elongated heating element, a base for said heating element adapted to be secured by said means whereby said element is securely held in said tube, means for causing air to circulate through the radiator, and means restricting the air flowing through the radiator to paths between the fins.

In witness whereof, I hereunto subscribe my name this 1st day of May, 1928.

REUBEN N. TRANE.